(12) United States Patent
Paine

(10) Patent No.: US 6,575,429 B2
(45) Date of Patent: Jun. 10, 2003

(54) DRIPLESS HOSE BIB

(76) Inventor: Lloyd D. Paine, P.O. Box 398, Jamul, CA (US) 91935

( * ) Notice: Subject to any disclaimer, the term of this patent is extended or adjusted under 35 U.S.C. 154(b) by 0 days.

(21) Appl. No.: 09/970,481

(22) Filed: Oct. 3, 2001

(65) Prior Publication Data

US 2003/0062497 A1 Apr. 3, 2003

(51) Int. Cl.$^7$ .................. F16L 33/00; F16K 51/00
(52) U.S. Cl. ..................... 251/148; 137/614.2
(58) Field of Search .............. 251/148; 137/614.2

(56) References Cited

U.S. PATENT DOCUMENTS

| 3,033,227 | A | * | 5/1962 | Goldman | 251/148 |
| 3,182,952 | A | * | 5/1965 | Montesi | 251/148 |
| 3,398,925 | A | * | 8/1968 | Scaramucci | 251/148 |
| 3,792,834 | A | * | 2/1974 | Billeter | 251/148 |
| 4,175,580 | A | * | 11/1979 | Kalbfleisch | 251/148 |
| 4,465,092 | A | * | 8/1984 | Vitale | 251/148 |
| 5,673,896 | A | * | 10/1997 | Gillen | 251/148 |
| 5,915,402 | A | * | 6/1999 | Mitchell, II | 251/148 |
| 6,050,545 | A | * | 4/2000 | Stolzman | 251/148 |
| 6,155,295 | A | * | 12/2000 | Nimberger | 251/148 |

* cited by examiner

*Primary Examiner*—Paul J. Hirsch
(74) *Attorney, Agent, or Firm*—Charles C. Logan, II

(57) ABSTRACT

A dripless hose bib for connection to a pressurized water source pipe. The dripless hose bib has a valve body having an inlet port, an outlet port and a fluid passageway connected between them. The front end of the valve body has an external garden hose thread. A ball valve is positioned in the fluid passageway. An aperture in the top surface of the valve body communicates with the ball valve. A vertically oriented valve stem has its bottom end detachably connected to the ball valve and its top end is connected to a transversely extending lever handle. A valve body plug is screwed into the rear end of the valve body and it in turn has a threaded bore in its rear end that threads onto the pressurized water source pipe.

3 Claims, 5 Drawing Sheets

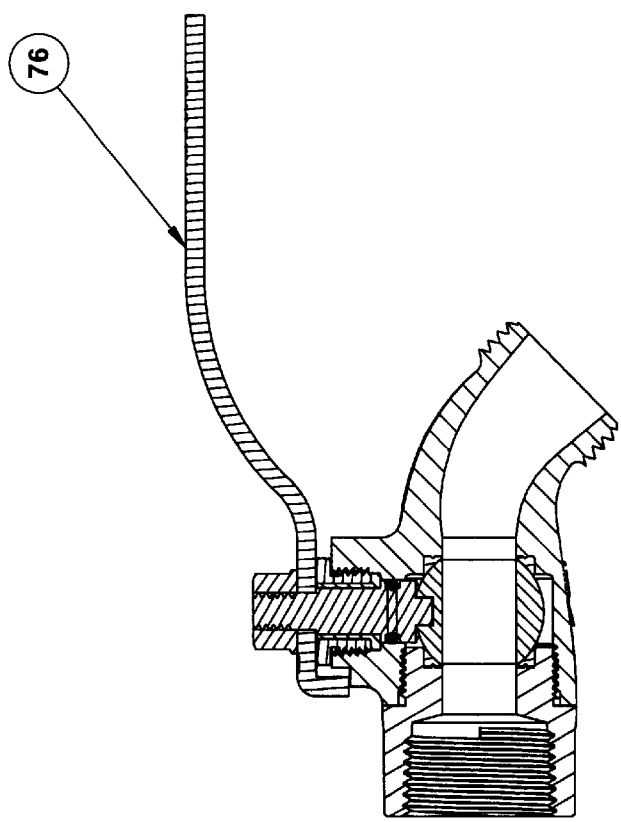

DRIPLESS HOSE BIB

BACKGROUND OF THE INVENTION

The invention relates to water spigots and more specifically to an outdoor hose bib that is connected to a pressurized water source pipe.

The present state of the art outdoor hose bibs have an inlet port, an outlet port and a fluid passageway connecting between them. They have a neck potion extending upwardly from the top surface of the hose bib and a valve stem aperture extends downwardly from the top end of the neck portion to communicate with the fluid passageway. The bottom end of the valve stem has structure for sealing off the flow of water through the valve body of the hose bib but it requires multiple revolutions of the valve stem. Part of the bottom end structure is usually a rubber or plastic washer that becomes ineffective after numerous times of opening and closing of the water flow. The result is periodic drips of water that escape the outlet port of the hose bib and as the washer further deteriorates the amount of drippage increases. The top end of the valve stem is normally rotated by a round wheel shaped handle or a T-shaped handle. The top end of the valve stem is often packed with string that with time tends to allow water to seep upwardly along the outer surface of the valve stem. After a certain period of time this water leakage becomes almost continuous.

It is an object of the invention to provide a novel dripless hose bib that eliminates water leakage through the front end of the valve body and leakage along the outer surface of the top end of the valve stem.

It is another object of the invention to provide a novel hose bib that only requires a ¼ turn of its handle to obtain a full un-restricted flow and likewise only a ¼ turn of its handle to stop all flow of water through the hose bib.

It is also an object of the invention to provide a novel hose bib that is easily and quickly assembled.

It is a further object of the invention to provide a novel hose bib that is economical to manufacture and market.

It is an additional object of the invention to provide a novel hose bib that is easily installed.

SUMMARY OF THE INVENTION

The dripless hose bib has for its primary component a valve body with a fluid passageway extending from its rear inlet port to its front outlet port. The front end of the valve body has external garden hose thread formed adjacent its front end. The valve body has a neck portion extending from the top surface of an intermediate portion. The neck portion has a valve stem aperture in its top end that communicates with the fluid passageway of the valve body. A ball valve is inserted into the inlet port of the valve body and positioned directly below the valve stem aperture. The ball valve has a bore hole that extends from its front end through to its rear end. The ball valve also has a notch formed on its top surface.

Positioned adjacent the respective front and rear surfaces of the ball valve are a pair of ball valve seals that ride the spherical shape of the ball valve to provide the actual water seal. A valve body plug is threaded into the inlet port to capture the ball valve in the valve body. The valve body plug has a threaded rear aperture that would be screwed onto the external threads on the front end of a pressurized water source pipe. Different styles of valve body plugs can have a different rear structure that allows for interchangability that would allow a valve body plug to be screwed onto a supply line using compression American Pipe Threads (NPT), compression threads (SAE 45°), internal "sweat" fitting and external "sweat" fitting.

The vertically oriented valve stem has a head on its bottom end that mates with the notch formed in the top surface of the ball valve. Additional structure allows the valve stem to be journaled in a valve stem nut that is screwed into the top end of the neck portion of the valve body. A four-sided shank portion is formed adjacent the top end of the valve stem that mates with a four-sided aperture in the front end of a lever handle. A nut screwed onto the top end of the valve stem keeps the entire assembly together. The lever handle has a rotation limit flange extending downwardly from its front edge that rides along an arcuate shoulder formed in the top end of the neck portion. The arcuate shoulder also has stop limit walls adjacent each of its ends. The lever handle merely requires a ¼ turn to obtain a full-unrestricted flow.

The valve body can be composed of casted brass, bronze, stainless steel, PVC, ceramic, composites or any other suitable material for the design and function. Its front outlet port has an axis directed downwardly from the horizontal that makes it easy to clean out the valve and supply line. Also it helps to prevent a hose attached to its front end from partially collapsing under its own weight and thereby restricting full flow of water therethrough.

The handle is preferably a die-casted part, but can be adapted to serve the physically challenged users by having a larger paddle, or for ornamental reasons the handle can take on common shapes (i.e. birds, squirrels or other animals and such).

DESCRIPTION OF THE DRAWINGS

FIG. 5 is a vertical cross sectional rear perspective view of the dripless hose bib.

DESCRIPTION OF THE PREFERRED EMBODIMENT

Figure 1:
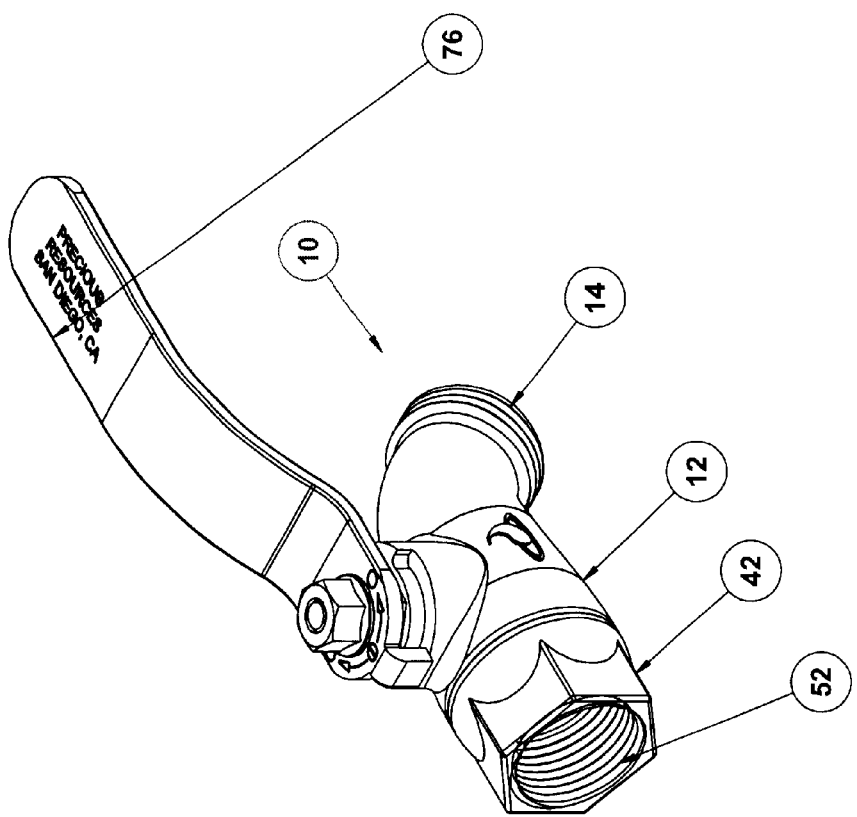
FIG. 1 is a rear perspective view of the dripless hose bib.
Figure 2:
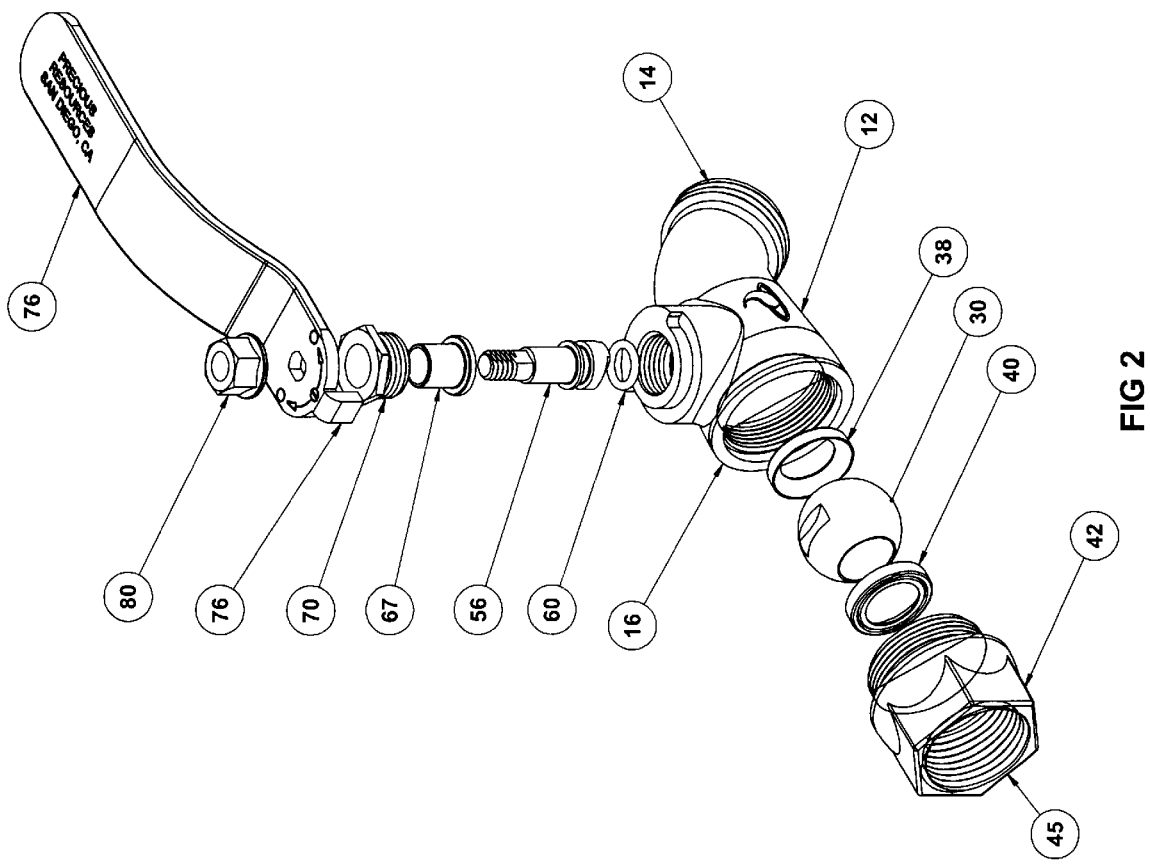
FIG. 2 is an exploded rear perspective view of the dripless hose bib.
Figure 3:
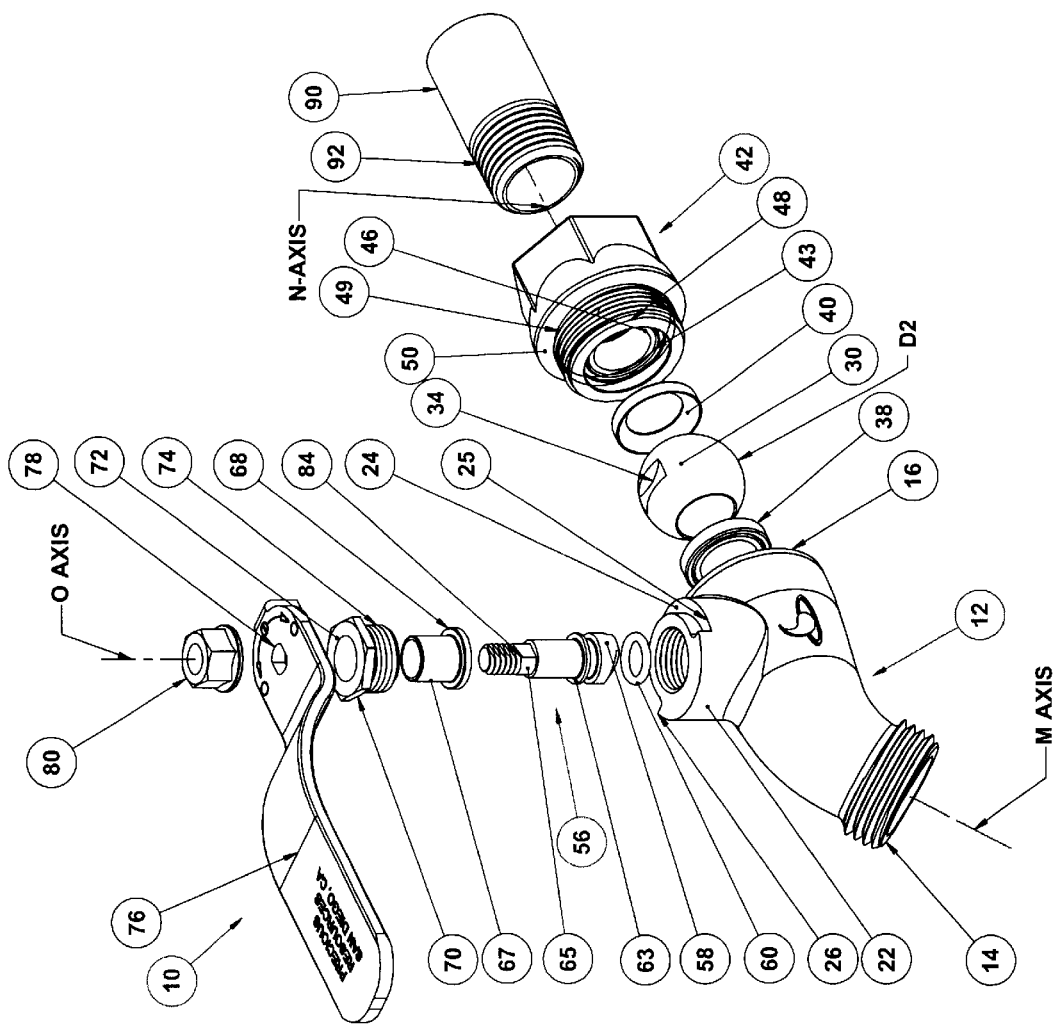
FIG. 3 is an exploded front perspective view of the dripless hose bib.
Figure 4:
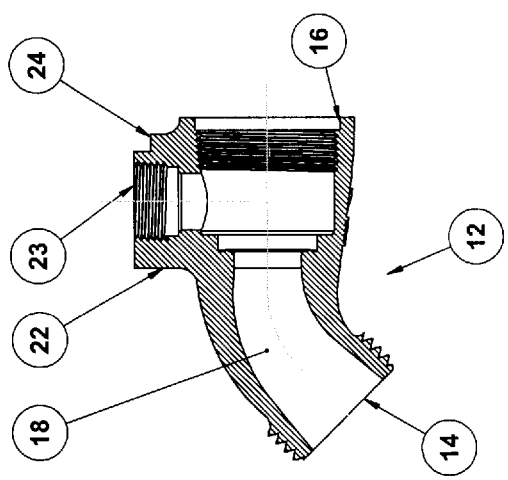
FIG. 4 is a vertical cross sectional view taken through the valve body.

The dripless hose bib will now be described by referring to FIGS. 1–5 of the drawings. The dripless hose bib is generally designated numeral 10.

The major component of dripless hose bib 10 is valve body 12. It has outlet port or orifice 14 having an m-axis. It also has an inlet port or orifice 16 having a n-axis. A fluid passageway 18 (P1) connects inlet port 16 with outlet port 14. Inlet port 16 has a diameter D1. The structure of the valve body 12 between its inlet port and outlet port is generally described as intermediate portion 20. Extending upwardly from intermediate portion 20 is a neck portion 22 having a valve stem aperture 23 formed in its top end that communicates with fluid passage 18. A portion of the top surface of neck portion 22 has been removed to form an arcuate shoulder 24 having a stop wall 25 and a stop wall 26 at its opposite ends. Valve stem aperture 23 has an o-axis. The O-axis and the [n] m-axis intersect each other at an obtuse angle that is in the range of 91°–179°. The front end of valve body 12 has been designed to slope downwardly from the horizontal n-axis in order to help prevent a hose connected to the front thereof from bending downwardly under its own weight and causing a reduction in the amount of water that flow into the hose.

A ball valve 30 having a diameter D2 is inserted through inlet port 16 to a position directly beneath valve stem aperture 24. Ball valve 30 has a bore hole 32 having an n-axis that extends from its front end to its rear end. A notch 34 is formed in the top surface of ball valve 30 and its purpose will be described later. A front ball valve seal 38 and a rear ball valve seal 40 seat on the respective front and rear surfaces of ball valve 30 and when ball valve 30 has been rotated 90° about a vertical axis, these two seal members will prevent water from traveling through fluid passageway 18 and out of outlet port 14.

Valve body plug 42 has an aperture 43 formed in its front end and an aperture 45 formed in its rear end and these are connected by a fluid passageway P2 along bore hole 46. The front end of valve body plug 42 has a neck portion 48 having external threads 49 and an annular shoulder 50. The rear end of bore 46 has internal threads 52.

Vertically oriented valve stem 56 has a head 58 formed on its bottom end. Head 58 mates with notch 34 in the top surface of ball valve 30 so that when valve stem 56 is rotated ¼ turn, ball valve 30 will rotate the same number of degrees. An o-ring 60 seats at the bottom end of internally threaded neck portion 22. Valve stem 56 has a cylindrical shank portion 62 having an annular flange 63 at its bottom end and a four-sided shank portion 65 adjacent its top end. A valve stem bushing 67 having a bottom annular flange 68 telescopes over cylindrical shank portion 62 and rests upon annular flange 63. Valve stem nut 70 has a bore hole 72 and external threads 74 that mate with the internal threads of valve stem aperture 24. Lever handle 76 has a four-sided aperture 78 in its front end that mates with the four-sided shank portion 65 of valve stem 56. A nut 80 has a threaded bore in its bottom end that mates with the external threads 84 adjacent the top end of valve stem 56.

A pressurized water source pipe 90 has external threads 92 adjacent its front end that mates with the internal threads 52 of valve body plug 42.

What is claimed is:

1. A dripless hose bib comprising:
   a hose bib valve body having a front end, a rear end, an intermediate portion, a top surface and a bottom surface; said rear end having an inlet port having a horizontal n-axis also has internal threads; said front end having an outlet port having an m-axis; said front end having external garden hose threads; said in-axis intersects said n-axis at an obtuse angle in the range of 91°–179° so that said front end of said hose bib valve body slopes downwardly from said horizontal n-axis in order to help prevent a hose connected to said front end from bending downwardly under its own weight and causing a reduction in the water flow;
   a fluid passageway P1 in said hose bib valve body between said inlet port and said outlet port;
   a ball valve having a front surface, a rear surface, a top surface and a bottom surface; a bore hole extends through said ball valve from said front surface to said rear surface; said ball valve being positioned in said fluid passageway P1 and this is done by inserting said ball valve into said inlet port; said ball valve has a diameter D2 and said inlet port of said hose bib valve body has a diameter D1 and D1 is at least slightly greater than D2 so that said ball valve can be inserted into said passageway P1 of said hose bib valve body through said inlet port; a notch is formed in said top surface of said ball valve;
   a valve body plug having a front end, a rear end, an inner surface and an outer surface; an aperture is formed in said front end and an aperture is formed in said rear end; a fluid passageway P2 is in said valve body plug between said front end and said rear end; said front end of said valve body plug having thread means that mate with said internal threads in said inlet port of said hose bib valve body; said rear end of said valve body plug having internal threads for connection to the outlet port of a pressurized water source pipe;
   a neck portion extends upwardly from said top surface of said intermediate portion, said neck portion having a top surface and a valve stem aperture is formed therein and said valve stem aperture is in communication with said top surface of said ball valve;
   an elongated vertically oriented valve stem having a top end and a bottom end; a head is formed on said bottom end; said head having structure that mates with said notch in said top surface of said ball valve so that when said valve stem is rotated, said ball valve will rotate the same number of degrees; said valve stem having an intermediate cylindrical shank portion having an upper end and a bottom end, a first annular flange is formed on said cylindrical shank portion adjacent said bottom end and a multi-sided shank portion is formed adjacent said top end; a valve stem bushing has a bottom flange and said valve stem bushing telescopes over said cylindrical shank portion and rests on said first annular flange; a valve stem nut has a bore hole and external threads that mate with said internal threads of said valve stem aperture of said neck portion; a lever handle having a front end has a multi-sided aperture formed adjacent said front end that receives and mates with said multi-sided shank portion adjacent said top portion of said valve stem; said multi-sided shank portion has external threads adjacent said top end of said valve stem and a nut is threaded thereon to secure said handle to said valve stem.

2. A dripless hose bib assembly as recited in claim 1 further comprising means for limiting rotational turning of said lever handle.

3. A dripless hose bib assembly as recited in claim 1 further comprising a ball valve seal positioned against said front end of said ball valve and a ball valve seal positioned against said rear end of said ball valve.

* * * * *